United States Patent [19]
Dixon et al.

[11] 4,302,375
[45] * Nov. 24, 1981

[54] PAINT COMPOSITIONS HAVING WET ADHESION CHARACTERISTICS

[75] Inventors: Dale D. Dixon, Kutztown; Frederick L. Herman, Allentown, both of Pa.

[73] Assignee: Air Products and Chemicals, Inc., Allentown, Pa.

[ * ] Notice: The portion of the term of this patent subsequent to Sep. 5, 1995, has been disclaimed.

[21] Appl. No.: 80,912

[22] Filed: Oct. 1, 1979

[51] Int. Cl.$^3$ .................. C08L 35/00; C08L 35/08
[52] U.S. Cl. .................. 260/29.6 RB; 260/29.6 RW; 260/29.6 WB; 260/29.6 TA
[58] Field of Search .............. 260/29.6 RB, 29.6 RW, 260/29.6 WB, 29.6 TA; 526/302

[56] References Cited
U.S. PATENT DOCUMENTS

| | | | |
|---|---|---|---|
| Re. 28,173 | 9/1974 | Marx et al. | 526/302 |
| 2,727,019 | 12/1955 | Melamed | 526/263 |
| 3,366,613 | 1/1968 | Kelley | 526/259 |
| 3,369,008 | 2/1968 | Hurwitz | 526/263 |
| 3,408,338 | 10/1968 | Szita et al. | 526/302 |
| 4,151,142 | 4/1979 | Herman et al. | 260/29.6 RW |

*Primary Examiner*—Amelia B. Yarbrough
*Attorney, Agent, or Firm*—Russell L. Brewer; E. Eugene Innis

[57] ABSTRACT

This invention relates to the paint composition having a unique paint vehicle, the paint vehicle comprises a latex comprising copolymer resin particles having at least 25% vinyl acetate polymerized therein, and the polymerized resin particles containing from about 0.1–10% by weight of a diallylic urea compound therein for providing wet adhesion characteristics to the paint composition.

7 Claims, No Drawings

PAINT COMPOSITIONS HAVING WET ADHESION CHARACTERISTICS

BACKGROUND OF THE INVENTION

1. Field of the Invention

The invention relates to paint compositions particularly semi-gloss and flat interior paint compositions. Latex paint compositions have captured a significant portion of the indoor and outdoor paint market because they have several advantages compared with the organic solvent type. Three significant advantages are: the paints offer an easy mechanism for clean up, there is substantially no air pollution and there is a reduced possibility of fire hazard. On the other hand, the coating properties and storage stability of the latex paints have been somewhat inferior to those of the solvent type, particularly in obtaining desired film thickness and obtaining good adhesion.

Two types of emulsions commonly used in formulating latex paints include the all acrylic system, e.g., the systems using copolymerized methyl methacrylate, butyl acrylate, 2-ethylhexyl acrylate with small proportions of acrylic acid, etc., as may be desired, and vinyl acetate formulations using vinyl acetate in combination with a small proportion of a lower alkyl acrylate, e.g., 2-ethylhexyl acrylate, methyl methacrylate, butyl acrylate, or dibutyl maleate. Heretofore, the all acrylic system has been used in premium quality paint as the emulsions have provided for good water resistance, desired leveling, film hardness, durability, scrubbability, etc.

Vinyl acetate-acrylic copolymer systems have been utilized in formulating interior flat, semi-gloss paints and exterior house paints. Vinyl acetate-butyl acrylate latices result in paint films with excellent toughness, scrub resistance and durability, while the vinyl acetate-dibutyl maleate emulsions have good abrasion resistance and flexibility as well as durability.

Wet adhesion, i.e., the quality of adhering to a previously painted, aged surface under wet or moist conditions, has been imparted to both acrylic systems and vinyl acetate systems by polymerizing a wet adhesion monomer into the copolymer.

Wet adhesion monomers generally have terminal olefinic unsaturation at one end and a terminal ureido group at the other end. U.S. Pat. Nos. 3,369,008, 3,366,613 and 2,727,019 disclose examples of such functional monomers.

SUMMARY OF THE INVENTION

This invention relates to an improved vinyl acetate copolymer emulsion particularly suited as a vehicle for interior and exterior paints, particularly interior semi-gloss paints. The paint composition comprises water, pigment, thickener, and latex comprising polymerized resin particles therein, the polymerized resin particle containing at least 25% of vinyl acetate and 0.1–10% by weight of a copolymerized diallylic urea composition for conferring wet adhesion thereto.

DESCRIPTION OF PREFERRED EMBODIMENT

The emulsions suited for practicing this invention are vinyl acetate latices. For interior and exterior usage, the vinyl acetate generally is copolymerized with monomers copolymerizable therewith, i.e., lower alkyl acrylates, e.g., as $C_1$–$C_8$ ester of acrylic and methacrylic acid which include methyl methacrylate, ethyl acrylate, butyl acrylate, 2-ethylhexyl acrylate; olefins e.g., ethylene; alkyl esters of alpha-beta unsaturated dicarboxylic acids, e.g., dibutyl maleate, dibutyl fumarate, dioctyl maleate, dibutyl itaconate; vinyl chloride, vinyl esters, e.g., vinyl butyrate, vinyl propionate; vinyl ethers such as methyl vinyl ether, n-butyl vinyl ether; and unsaturated carboxylic acids and amides, e.g., acrylic, and methacrylic acid, acrylamide and methacrylamide. To achieve wet adhesion in the paint composition, the wet adhesion monomer used is a diallylic urea compound represented by the formula:

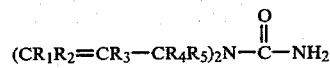

wherein $R_1$, $R_2$ are hydrogen, alkyl, phenyl, or hydroxyalkyl; $R_3$ is hydrogen, or lower alkyl, $R_4$ and $R_5$ are hydrogen, methyl or phenyl. It is recognized the degree of substitution on the diallylic urea compound can interfere with the copolymerizability of the diallylic urea composition making it more difficult to include in the resin particle. Generally, the substitution should not include more than one to two carbon atoms and then only substitution at one carbon atom. In a preferred case, diallyl urea is the preferred monomer for conferring wet adhesion as it is easily made and provides excellent results.

The diallylic urea composition is included in the polymerized resin particles in a broad range from 0.1–10% by weight of the monomers and preferably in a range from about 0.5 to 2.5%.

The latexes used in forming the paint composition contain copolymers having at least 25% and generally from about 80 to 95% vinyl acetate, 15 to 20% of a comonomer, e.g., a lower alkyl acrylate or olefin and 0.5–2.5% of the diallylic urea compound. The particular emulsion system best suited for interior semi-gloss applications is a vinyl acetate-butyl acrylate or vinyl acetate-ethylene copolymer having the diallylic urea monomer interpolymerized therein. One example of a preferred latex copolymer contains 80–95% by weight vinyl acetate, 4–18.5% butyl acrylate and the balance being diallyl urea.

In terms of a tetrapolymer, it has been found that a composition containing broadly from 25–65% vinyl chloride, 30–65% vinyl acetate, 10–15% ethylene and the balance consisting of the diallylic urea composition is extremely satisfactory. The presence of vinyl chloride greatly enhances the flexibility of the film.

The emulsions are prepared by a conventional emulsion polymerization technique. Such conditions generally involve polymerization temperature of about 40°–80° C. and the recipe may contain various protective colloids, e.g., polyvinyl alcohol hydroxyethyl starch, carboxymethyl cellulose, etc. in an amount of about 0.8–1.5% by weight of the monomers. The polymerization is carried out to provide a proportion of copolymer resin particles generally from 40–70% and usually about 50–55% by weight.

Surfactants which can be used in conventional amounts are included in a proportion from about 0.5–5% by weight of the latex to stabilize the emulsion. Generally, the surfactants are nonionic emulsifying agents and include polyoxyethylene condensates, e.g., polyoxyethylene aliphatic ethers, polyoxyethylene aralkyl ethers, condensates of ethylene oxide and tall oil acids and the like.

Free radical initiators used to effect polymerization of the monomers may be of the peroxy or redox type. Examples are hydrogen peroxide, potassium persulfate, t-butyl peroxypivalate, and ferrous ammonium sulfate with sodium or zinc formaldehyde sulfoxylate.

EXAMPLE 1

EMULSION

A 3 liter resin kettle was used as the primary vessel, and to this vessel was charged.

| COMPOUND | GRAMS |
| --- | --- |
| Deionized Water | 262 |
| Natrosol 250JR (2.0% solution) hydroxyethyl cellulose | 360 |
| Igepal CO-887 | 15.6 |
| Igepal CO-630 | 3.66 |
| Pluronic F-68 | 2.74 |
| Pluronic L-64 | 0.91 |
| Sodium Persulfate | 3.0 |
| Ferrous Ammonium Sulfate | trace |
| Sodium Benzoate | 2 |

The pH of the resulting premix solution was 5.5.

After the above contents were charged to the primary vessel, mild agitation was effected using a single turbine stirrer rotated at 75 rpm with the contents heated to 62° C. The vessel was then purged with nitrogen to remove oxygen.

A monomer mixture was formed in secondary vessel 1 and included:

| SECONDARY VESSEL 1 | |
| --- | --- |
| COMPOUND | GRAMS |
| Vinyl acetate | 810 |
| n-butyl acrylate | 90 |
| Pluronic F-68 | 8.23 |
| Pluronic L-64 | 2.74 |

In secondary vessel 2 there were charged:

| SECONDARY VESSEL 2 | | |
| --- | --- | --- |
| COMPOUND | GRAMS | |
| Distilled water | 93.25 | |
| N,N-Diallyl urea | 6.75 | (0.75% based on the weight of monomers) |
| Sodium Persulfate | 1.5 | |
| Sodium Benzoate | 0.5 | |

With constant agitation in the primary vessel, the contents from secondary vessel 1 and secondary vessel 2, were added to the primary vessel over a three hour period. The temperature was maintained at 62° C. and the vinyl acetate monomer in the primary vessel, based on the weight of the latex, was maintained between 3-5%. The appropriate vinyl acetate content was maintained by delaying from a third vessel, a reducing agent solution consisting 49.75 grams distilled water and 0.25 grams sodium formaldehyde sulfoxylate to the primary vessel. After the contents from secondary vessels 1 and 2 and reducing solution from vessel 3 were added to the primary vessel, the vinyl acetate monomer content was reduced to less than 0.5% by weight of the latex by adding a catalyst solution consisting of 5 ml of a 70% solution of tertiary-butyl hydroperoxide in 20 milliliters water and 2 milliliters of Igepal CO-887 surfactant. At the completion of the polymerization, the pH was 2.5 and it was adjusted to 5.5 by adding 7% ammonium hydroxide solution. The emulsion solids were 55.5%.

EXAMPLE 2

The procedure of Example 1 was repeated except that the level of diallyl urea was increased to 1% by weight of the monomers e.g., 9 grams of diallyl urea was added to the vessel.

EXAMPLE 3

SEMI-GLOSS PAINT SCREENING FORMULA

A standard paint formulation for semi-gloss application was used to compare the various emulsions prepared by the techniques of Examples 1 and 2. The formulation was conventional and contained:

| COMPOUND | GRAMS |
| --- | --- |
| Propylene glycol | 65 |
| Tamol 731 | 14 |
| Foamaster 44 | 2 |
| Ti-Pure R-900-titanium dioxide (disperse and add) | 275 |
| Water | 60 |
| Aerosol OT, 75% sodium dioctyl succinate | 2 |
| Carbitol acetate | 15 |
| Natrosol 250 MR, 3% Hydroxyethyl Cellulose | 75 |
| Merbac 35 Pigment | 1 |
| Ammonium Hydroxide | 1 |
| Water* and/or Natrosol solution | — |
| Emulsion @ 55% solids | 460 |

*Water and Natrosol varied to maintain viscosity in commercially usable range, generally 82 ± 2Ku (Krebs Units). The paint compositions were then tested for floating board and cut film wet adhesion tests.

FLOATING BOARD TEST

A 6 inch by 6 inch piece of clear white pine was first coated with an alkyd enamel paint and then with an alkyd gloss enamel and allowed to dry for a minimum of 3 days. The test paints were applied to the alkyd coated pine board in liberal quantity and allowed to dry for 3 days at 75° F. and 58% relative humidity. Using a sharp knife or scribe, a series of parallel cuts approximately 1/10 inch apart were made and formed into a 100 square grid pattern. A strip of masking tape was applied to the cut section and rubbed with the thumb to insure contact. The tape then was pulled sharply at a 90° angle, and the percent paint removed from the alkyl substrate noted. A second series of cuts were made in the top paint film and the board placed face down in tap water. After one hour, the board was removed from the water, wiped dry and tape applied to the cross-hatched area and pulled. The percent remaining was recorded. A low percent removal of paint indicates good wet adhesion and a high removal indicates poor wet adhesion.

CUT FILM WET ADHESION TEST

A Leneta metal scrub panel was coated with an alkyd enamel using a 7 mil side of a Dow Film Caster and allowed to dry a minimum of three days and maximum of nine days at 75° F. at 50% relative humidity. Test paints were applied to the panel using a drawdown bar suitable to give a 2 mil dry film thickness. The paint was allowed to dry 72 hours at 75° F., 50% relative humidity. A cut was made completely through the surface and down the center of the drawdown of the test paint with the razor blade held at a 45° angle. The panel was placed on a Gardner Washability Machine and scrubbed under water with a standard hog bristle brush, presoaked in water.

If no adhesion failure occurred after 5,000 cycles, a second cut parallel to the first ½ inch apart was made and the cycle repeated an additional 1,000 cycles.

Both paint compositions using the emulsions from Examples 1 and 2 passed the cut film test. On the other hand, 95% removal was obtained in the floating board test for Example 1 while zero percent of the paint was removed with the emulsion of Example 2.

What is claimed is:

1. In a paint composition comprising water, pigment, thickener and a latex comprising polymerized resin particles containing at least 25% of vinyl acetate by weight, the improvement which comprises including from about 0.1-10% by weight of copolymerized diallylic urea composition represented by the formula:

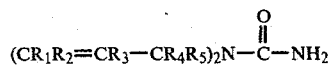

wherein $R_1$, $R_2$ are hydrogen, alkyl, phenyl, or hydroxyalkyl;
$R_3$ is hydrogen, or lower alyl, $R_4$ and $R_5$ are hydrogen, methyl or phenyl 2. The paint composition of claim 1 wherein $R_1$ and $R_2$ are hydrogen or methyl.

3. The paint composition of claim 2 wherein $R_3$, $R_4$ and $R_5$ are hydrogen.

4. The paint composition of claim 3 wherein $R_1$ and $R_2$ are hydrogen.

5. The paint composition of claim 4 wherein said copolymerization diallylic urea compound is present in a proportion from 0.5-2.5% by weight of the monomers.

6. The paint composition of claim 5 wherein said emulsion contains from 80-95% vinyl acetate, and 4-18.5% butyl acrylate.

7. The paint composition of claim 4 wherein the resin particle contains from 25-65% vinyl chloride 30-55% vinyl acetate, 10-15% ethylene and 0.5-2.5% of diallyl urea compounds.

* * * * *

UNITED STATES PATENT AND TRADEMARK OFFICE
CERTIFICATE OF CORRECTION

PATENT NO. : 4,302,375
DATED : 24 November 1981
INVENTOR(S) : Dale D. Dixon, Frederick L. Herman It is certified that error appears in the above-identified patent and that said Letters Patent are hereby corrected as shown below:

Claim 1, Column 6, Line 8
    Delete "alyl" and substitute therefor --alkyl--

Claim 1, Column 6, Line 9
    After phenyl insert --.--

Claim 5, Column 6, Line 17
    Delete "copolymerization" and substitute therefor --copolymerized--

Signed and Sealed this

Twenty-third Day of November 1982

[SEAL]

Attest:

Attesting Officer

GERALD J. MOSSINGHOFF
Commissioner of Patents and Trademarks